United States Patent
Zanzig et al.

(10) Patent No.: US 6,561,244 B2
(45) Date of Patent: May 13, 2003

(54) TIRE HAVING TREAD WITH COLORED GROOVE CONFIGURATION

(75) Inventors: David John Zanzig, Uniontown, OH (US); George Frank Balogh, North Canton, OH (US); Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 177 days.

(21) Appl. No.: 09/775,381

(22) Filed: Feb. 1, 2001

(65) Prior Publication Data

US 2002/0174924 A1 Nov. 28, 2002

(51) Int. Cl.$^7$ .............................. B60C 1/00; B60C 11/00
(52) U.S. Cl. ................. 152/209.5; 152/209.18
(58) Field of Search .................. 152/154.2, 209.5, 152/524, DIG. 12, 209.18

(56) References Cited

U.S. PATENT DOCUMENTS

| | | | |
|---|---|---|---|
| 2,272,891 A | * 2/1942 | Coben | |
| 3,768,537 A | * 10/1973 | Hess et al. | |
| 3,814,160 A | * 6/1974 | Creasey | |
| 5,094,829 A | 3/1992 | Krivak et al. | 423/339 |
| 5,397,616 A | 3/1995 | Aoki | 428/33 |
| 5,708,069 A | 1/1998 | Burns et al. | 524/403 |
| 5,750,610 A | 5/1998 | Burns et al. | 524/434 |
| 5,789,514 A | 8/1998 | Burns et al. | 528/12 |
| 5,817,719 A | * 10/1998 | Zanzig et al. | |
| 6,147,166 A | * 11/2000 | Araki et al. | |
| 6,397,912 B1 | * 6/2002 | Watanabe et al. | |
| 6,441,070 B1 | * 8/2002 | Halasa et al. | |

FOREIGN PATENT DOCUMENTS

| | | | |
|---|---|---|---|
| DE | 9102607.5 | * | 7/1991 |
| EP | 0682071 | | 4/1995 |
| EP | 715974 | * | 6/1996 |
| EP | 864447 | * | 9/1998 |
| GB | 2265586 | | 10/1993 |
| GB | 2312654 | | 11/1997 |
| JP | 61-146605 | * | 7/1986 |
| JP | 63-17103 | * | 1/1988 |
| JP | 11-151908 | * | 6/1999 |
| WO | WO 99/06228 | * | 2/1999 |
| WO | 9931178 | | 6/1999 |

OTHER PUBLICATIONS

*Encyclopedia of Chemical Technology*, 4$^{th}$ Edition, vol. 21, by Kirk–Othmer, "Recycling, Oil to Silicon".
"A New Isobutylene Copolymer: Non–tire Uses" by D. Kruse and J. Fusco, *Rubber & Plastics News*, Feb. 1, 1993.
*Introduction to Organic Chemistry*, 2$^{nd}$ Edition by A. Steitwieser, Jr. and C. H. Heathcock; p. 829.
Japanese Abstract 11151908, vol. 1999, No. 11, Sep. 30, 1999.
European Search Report.

* cited by examiner

*Primary Examiner*—Steven D. Maki
(74) *Attorney, Agent, or Firm*—Henry C. Young, Jr.

(57) ABSTRACT

The present invention relates to a tire having a rubber tread of a lug and groove configuration and of a co-extruded cap/base construction; wherein the tread cap is of a rubber composition which contains carbon black and is thereby of a black color; wherein a visible surface of at least one groove is of a rubber composition exclusive of carbon black and is of a non-black color and wherein said visible non-black colored rubber composition is a rubber layer which underlies said tread cap. Said visible non-black colored rubber is exclusive of any appreciable portion of, and preferably exclusive of, the surface of said tread lugs intended to be ground-contacting. In one aspect of the invention, said non-black colored rubber composition contains an amorphous precipitated silica reinforcement, preferably a prehydrophobated precipitated silica. In another aspect of the invention, said non-black colored rubber composition, and alternately, carbon black containing black colored rubber compositions adjoining said non-black colored rubber composition, is comprised a blend of at least one diene based elastomer and a brominated copolymer of isobutylene and p-methylstyrene together with an organo phosphite.

18 Claims, 5 Drawing Sheets

TIRE HAVING TREAD WITH COLORED GROOVE CONFIGURATION

FIELD OF THE INVENTION

The present invention relates to a tire having a rubber tread of a lug and groove configuration and of a co-extruded cap/base construction; wherein the tread cap is of a rubber composition which contains carbon black and is thereby of a black color; wherein a visible surface of at least one groove is of a rubber composition exclusive of carbon black and is of a non-black color and wherein said visible non-black colored rubber composition is a rubber layer which underlies said tread cap. Said visible non-black colored rubber is exclusive of any appreciable portion of, and preferably exclusive of, the surface of said tread lugs intended to be ground-contacting. In one aspect of the invention, said non-black colored rubber composition contains an amorphous precipitated silica reinforcement, preferably a pre-hydrophobated precipitated silica. In another aspect of the invention, said non-black colored rubber composition, and alternately, carbon black containing black colored rubber compositions adjoining said non-black colored rubber composition, is comprised a blend of at least one diene based elastomer and a brominated copolymer of isobutylene and p-methylstyrene together with an organo phosphite.

BACKGROUND OF THE INVENTION

Tires are typically provided with treads which contain carbon black reinforcement and which are therefore black in color.

Most tires have a rubber tread of a lug and groove configuration. Many tires are of a co-extruded cap/base construction, wherein the tread cap is an outer rubber layer which contains the lug and groove configuration for which the outer surfaces of the lugs are designed to be ground-contacting, and wherein the tread base is integral with and underlies the tread cap and is not normally intended to be ground-contacting. Such cap/base tire construction and such tread lug and groove configuration are well known to those having skill in such art.

It is appreciated that, for some tire treads, the tread lugs are in a form of individual lugs and may also be in a form of circumferential ribs. For the purposes of this invention tread lugs and ribs are referred to herein as tread lugs unless otherwise indicated.

Historically, it has sometimes been desirable to provide a tire with a tread of which at least a portion is of a non-black color so that the resulting tread is of a multiplicity of colors, namely black and at least one non-black color.

However, a significant disadvantage of tire treads having a non-black colored outer tread lug surface designed to be ground-contacting is:

(A) a tendency of such non-black colored tread lug surfaces to leave colored markings on the road over which they travel, which can conflict with and confuse colored road markings intended to aid or control vehicular traffic patterns and (B) a tendency of the such non-black colored tread lug surfaces to become discolored, particularly unevenly discolored, as the outer surface of the tread lugs travel over, or are parked on, oily ground surfaces such as, for example, asphalt roads.

However, it sometimes still remains desirable to provide a tire with a tread of which at least a portion of the visible tread surface has a color which contrasts with the primary black color of the tire tread.

For purposes of this invention, it is intended to provide a black-colored tread of lug and groove configuration which is further configured with at least a portion of the visible surface of at least one of said tread grooves is of a non-black color, preferably a color which contrasts with black, and is of an integral rubber composition which is not carbon black reinforced, namely a rubber composition which is co-extruded with and co-vulcanized with the remainder of the tire tread and is therefore integral therewith.

Thus it is desired that the visible portion of the tire tread is of at least two different visible colors, namely black and at least one additional non-black color which is positioned as a visible portion of least one of said tread grooves and is essentially exclusive of the outer surface of any lug associated with, or a part of, said groove, which is intended to be ground-contacting.

In particular, for the purposes of this invention, such non-black colored, visible groove surface is reinforced with a particulate synthetic amorphous silica and is exclusive of carbon black. Preferably it is also exclusive of any appreciable amount of white colored titanium dioxide pigment.

Accordingly, for this invention, it is desired to provide a black-colored, carbon black reinforced tire tread with at least portion of the visible tread surface being of an integral, non-black colored rubber composition designed to have minimal, in any, contact with the road therefore having minimal, if any, effect upon the wear and traction characteristics of the tire tread. This is accomplished by substantially limiting the non-black colored component of the black-colored tire tread to one or more of the grooves of a tire tread having a lug and groove configuration.

Historically, for a tire tread of cap/base construction which is composed of lugs and grooves, it has previously been proposed to provide such a tread where a portion of the underlying tread base rubber composition extends through the tread cap and is exposed at the surface of the bottom of the tread grooves with a purpose of retarding, or preventing, rubber cracking at the bottom of the tread grooves. For example, see U.S. Pat. No. 5,397,616. However, a visibly multicolored tire tread is not seen to be contemplated.

Also, historically, a typical example of a component of a tire having a color which contrasts with the conventional black color of the tire is a tire sidewall in which a portion of the rubber is white in color resulting from a blend of rubber and titanium dioxide pigment in the absence of, or exclusive of, particulate carbon black reinforcement. Indeed, tires with white colored portions of their sidewalls are well known.

However, for tire treads, it is also appreciated that coloring pigments such as titanium dioxide, by itself, do not provide significant rubber reinforcement equivalent to rubber reinforcing carbon black. Therefore, such white colored tire components are conventionally limited to rubber compositions which do not need such a high degree of reinforcement such as for example, outer, visible, portions of tire sidewalls.

It is also appreciated that many non-black colored rubber compositions for tire components, particularly white sidewall components have a tendency to discolor as a result of various discoloring chemicals which may be contained in various rubber compositions which are adjacent to the colored rubber composition. Accordingly, it is a common practice to substitute non-discoloring chemicals for discoloring chemicals in such adjacent rubber compositions such as for example, non-discoloring antidegradants and non-discoloring rubber processing oils. Such practice is well known in the tire white sidewall art.

A coupling agent is often used for silica-containing rubber compositions to aid in enabling the silica to reinforce the rubber composition. Widely used coupling agents for such purpose are comprised of a moiety (e.g. an alkoxysilane moiety) which is reactive with hydroxyl groups (e.g. silanol groups) on the surface of the silica and another moiety (e.g. a polysulfide moiety) which is interactive with unsaturated elastomers which contain carbon-to-carbon double bonds in their elastomer backbone. Such silica coupling agent activity is believed to be well known to those skilled in such art.

However, if it is contemplated that a saturated elastomer be used, which inherently does not have carbon-to-carbon double bonds in its backbone, such as a halogenated (e.g. brominated) copolymer of isobutylene and p-methyl styrene, such elastomer does not inherently respond to sulfur bonding or crosslinking in the manner of unsaturated diene-based elastomers.

Accordingly, coupling agents for the silica which rely upon an interaction with diene-based elastomers which contain carbon-to-carbon double bonds unsaturation in their backbone, namely polysulfide based couplers such as, for example bis(3-alkoxysilylalkyl) polysulfides, are considered herein to have limited value for coupling the silica to the elastomer, even when the rubber composition also contains a diene hydrocarbon based elastomer, wherein the rubber composition has an appreciable amount of an elastomeric brominated copolymer of isobutylene and p-methyl styrene.

In practice, the aforesaid saturated halogenated copolymer elastomer might be prepared, for example, by first copolymerizing isobutylene and p-methyl styrene. Usually a ratio of isobutylene to p-methyl styrene in a range of about 50/1 to about 7/1 is used. The resulting copolymer is then halogenated with a halogen such as bromine which occurs at the paramethyl position, yielding a benzyl bromide functionality. The degree of bromination can typically be varied from about 0.5 to about 2.5, usually preferably about 1.5 to about 2.5, weight percent, based upon the copolymer of isobutylene and p-methyl styrene.

The following reference provides additional information relating to the preparation of such halogenated copolymers: "A New Isobutylene Copolymer; Non-tire Uses" by D. Kruse and J. Fusco, *Rubber & Plastics News*, Feb. 1, 1993.

Such brominated copolymer of isobutylene and p-methyl styrene may, for example, have physical properties such as, for example, a Mooney viscosity value ML(1+8) at 125° C.) in a range of about 35 to about 60 and a Tg in a range of about −50° C. to about −60° C.

It is to be appreciated that such halogenated (e.g. brominated) copolymer elastomer has a completely saturated backbone as being devoid of carbon-to-carbon double bond unsaturation and therefore is uniquely useful for a rubber composition where stability of various of its physical properties desired when the rubber composition is exposed to atmospheric conditions which conventionally attack unsaturated diene-based elastomers and particularly oxidative influences of ozone.

However, the utility for such halogenated saturated elastomers is limited because, as hereinbefore discussed, because of its lack of carbon-to-carbon double bonds, it is not considered as being reactive with sulfur and is therefore not ordinarily considered as being sulfur curable in a sense of diene hydrocarbon-based elastomers.

Historically, some organo phosphites have previously been recognized as being reactive with alkyl halides. For example, see *Introduction to Organic Chemistry*, 2$^{nd}$ Edition, by A. Steitwieser, Jr., and C. H. Heathcock, Page 829, which refers to a Arbuzov-Michaelis reaction of a phosphite with an alkyl halide.

It is contemplated herein to apply such indicated alkyl halide activity of organo phosphites for enhancing the utilization of silica reinforcement of rubber compositions which contain a halogenated copolymer of isobutylene and p-methyl styrene.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" refers to parts of a respective material per 100 parts by weight of rubber, or elastomer. The terms "rubber" and "elastomer" may be used interchangeably unless otherwise indicated. The terms "cure" and "vulcanize" may be used interchangeably unless otherwise indicated.

SUMMARY AND PRACTICE OF THE INVENTION

In accordance with this invention, a tire having a rubber tread configured with lugs and grooves wherein the walls of said grooves are also the walls of lugs associated with said grooves, wherein the outer surfaces of at least a portion of said lugs, exclusive of said walls, are designed to be ground-contacting; wherein said tread is comprised of a carbon black-containing, black-colored rubber composition, wherein:

(A) said rubber tread contains a non-black colored rubber layer co-extruded with said tread cap layer wherein said non-black colored rubber layer extends to a visible surface of a wall of at least one of said tread grooves, exclusive of any appreciable portion of, preferably exclusive of, an outer surface of a black-colored tread lug designed to be ground-contacting wherein said tread groove wall is also the wall of said tread lug, and wherein said non-black colored rubber layer is (1) a non-black colored rubber layer co-extruded with and underlying said tread and comprised of a rubber composition which contains a colorant other than black and is exclusive of carbon black, or (2) an intermediate non-black colored rubber layer positioned between and co-extruded with said tread and a tread base layer, wherein said intermediate rubber layer is comprised of a rubber composition which contains a colorant other than black and is exclusive of carbon black and wherein said tread base layer is a carbon black containing, black-colored, rubber composition; and wherein (B) said non-black colored rubber layer is comprised of (1) 100 phr of elastomer comprised of
  (a) about 20 to about 100 phr of at least one diene-based elastomer and
  (b) from zero to about 80 phr of a halogenated copolymer of isobutylene and p-methyl styrene, wherein said halogen is selected from bromine or chlorine, preferably bromine, (2) about 25 to about 100 phr of silica comprised of particulate synthetic amorphous silica selected from at least one of
  (a) aggregates of precipitated silica having hydroxyl groups (e.g. silanol groups) on the surface thereof, and (b) pre-hydrophobated aggregates of precipitated silica having been pre-hydrophobated by treating silica in an aqueous colloidal form thereof with an alkylsilane or with both an organomercaptosilane and an alkylsilane in a weight ratio of said organomercaptosilane to said alkylsilane in a range of from 10/90 to 90/10;

wherein said alkylsilane is of the general Formula (I)

wherein R is an alkyl radical having from one to 18 carbon atoms, n is a value of from 1 to 3 and X is a radical selected from chlorine or bromine or alkoxy radical as $(OR^1)$—, wherein $R^1$ is an alkyl radical selected from methyl and ethyl radicals, and where said organomercaptosilane is of the general formula (II):

wherein X is a radical selected from chlorine, bromine, and alkyl radicals having from one to 16 carbon atoms; wherein $R^2$ is an alkyl radical having from one to 16 carbon atoms and $R^3$ is an alkylene radical having from one to 16 carbon atoms; and n is a value from zero to 3;

(3) from zero to about 15 phr of a coupling agent having a moiety reactive with hydroxyl groups contained on the surface of said aggregates of precipitated silica and another moiety interactive with said diene-based elastomer(s);

(4) from zero to 20 phr of at least one organo phosphite, or from 0.5 to 20 phr of at least one organo phosphite where said elastomer includes said halogenated copolymer, wherein said organo phosphite is selected from monophosphites selected from formula (III) and diphosphites selected from formula (IV) and diisodecyl pentearythritol diphosphite, distearyl pentearythritol diphosphite and pentearythritol diphosphite, preferably monophosphites of formula (III):

and

wherein each $R^4$ radical is independently selected from alkyl radicals and phenyl radicals and alkyl substituted phenyl radicals; wherein said $R^4$ alkyl radicals have from 1 to 18 carbon atoms, wherein $R^5$ is a phenyl radical; and wherein $R^6$ is selected from alkyl radicals having from 2 to 8 carbon atoms;

wherein said organo phosphite is provided by one or more of the following:
(a) by mixing said organo phosphite with said elastomer(s) and said synthetic silica in an internal rubber mixer,
(b) by pre-reacting said halogenated copolymer of isobutylene and p-methyl styrene with said organo phosphite prior to blending said reinforcing filler therewith,
(c) by pre-reacting said organo phosphite with an aqueous dispersion of colloidal silica particles from which a precipitated silica is recovered to form an organo phosphite/silica composite thereof,
(d) mixing said organo phosphite with said elastomer(s) and said synthetic silica, preferably in an internal rubber mixer, according to any of said steps (a), (b) or (c), wherein said synthetic silica includes at least one of said pre-hydrophobated silica aggregates which has been pre-hydrophobated prior to mixing with said elastomers,
(e) mixing said organo phosphite with said elastomer(s) and an alkylsilane of the said Formula (I) with said elastomer(s) and said synthetic silica, preferably in an internal rubber mixer, and
(f) by pre-reacting said organo phosphite and said alkylsilane of Formula (I) with
(i) said aggregates of synthetic precipitated silica or
(ii) an aqueous dispersion of colloidal silica particles from which a precipitated silica is recovered to form a silica composite thereof.

In one aspect of the invention, a tire is provided having a rubber tread configured with lugs and grooves wherein a portion of said grooves are of a non-black color and are exclusive of carbon black and wherein the faces of said lugs are designed to ground-contacting, contain carbon black and are thereby of a black color, wherein:

(A) said rubber tread contains a non-black colored, silica reinforced, rubber layer, exclusive of carbon black, underlying said groove faces, which extends to a visible bottom of at least one of said tread grooves and is thereby exclusive of any appreciable portion of said lug face and wherein said non-black colored rubber layer is either
(1) a tread base rubber layer co-extruded with and underlying a carbon black containing, black-colored tread cap layer, or
(2) an intermediate rubber layer positioned between and co-extruded with said tread cap layer and a black colored, carbon black-containing tread base layer, and wherein
(B) said non-black colored rubber layer is comprised of
(1) 100 phr of elastomer comprised of
  (a) about 20 to about 100 phr of at least one diene-based elastomer and
  (b) from zero to about 80 phr of a halogenated copolymer of isobutylene and p-methyl styrene, wherein said halogen is selected from bromine or chlorine,
(2) about 25 to about 100 phr of silica comprised of aggregates of synthetic amorphous silica which contains hydroxyl groups (e.g. silanol groups) on its surface, and
(3) a coupling agent having a moiety reactive with hydroxyl groups on the surface of said silica aggregates and another moiety interactive with at least one of said elastomers.

In one aspect of the invention, said non-black colored rubber layer is comprised of (A) 100 phr of elastomer comprised of
(1) about 20 to about 100 phr of at least one diene-based elastomer and
(2) from zero to about 80 phr of a halogenated copolymer of isobutylene and p-methyl styrene, wherein said halogen is bromine or chlorine,
(B) about 25 to about 100 phr of silica comprised of aggregates of synthetic amorphous silica selected from at least one of
(1) aggregates of precipitated silica having hydroxyl groups (e.g. silanol groups) on the surface thereof, and (2) pre-hydrophobated aggregates of precipitated silica having been pre-hydrophobated by treating silica in an aqueous colloidal form thereof with an alkylsilane or with both an organomercaptosilane and an alkylsilane in a weight ratio of said organomercaptosilane to said alkylsilane in a range of from 10/90 to 90/10;
wherein said alkylsilane is of the general Formula (I)

$$X_n\text{—}Si\text{—}R_{4-n} \qquad (I)$$

wherein R is an alkyl radical having from one to 18 carbon atoms, n is a value of from 1 to 3 and X is a radical selected from chlorine or bromine or alkoxy radical as (OR$^1$)—, wherein R$^1$ is an alkyl radical selected from methyl and ethyl radicals, and where said organomercaptosilane is of the general formula (II):

$$(X)_n(R^2O)_{3-n}\text{—}Si\text{—}R^3\text{—}SH \qquad (II)$$

wherein X is a radical selected from chlorine, bromine, and alkyl radicals having from one to 16 carbon atoms; wherein R$^2$ is an alkyl radical having from one to 16 carbon atoms and R$^3$ is an alkylene radical having from one to 16 carbon atoms; and n is a value from zero to 3;
(3) from zero to about 15 phr of a coupling agent having a moiety reactive with hydroxyl groups contained on the surface of said aggregates of precipitated silica and another moiety interactive with said diene-based elastomer(s);
(4) from zero to 20 phr of at least one organo phosphite, or from 0.5 to 20 phr of at least one organo phosphite, where said elastomer includes said halogenated copolymer, wherein said organo phosphite is selected from monophosphites selected from formula (III) and diphosphites selected from formula (IV) and diisodecyl pentearythritol diphosphite, distearyl pentearythritol diphosphite and pentearythritol diphosphite, preferably monophosphites of formula (III):

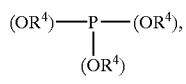

and

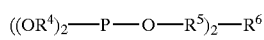

wherein each R$^4$ radical is independently selected from alkyl radicals and phenyl radicals and alkyl substituted phenyl radicals; wherein said R$^4$ alkyl radicals have from 1 to 18 carbon atoms, wherein R$^5$ is a phenyl radical; and wherein R$^6$ is selected from alkyl radicals having from 2 to 8 carbon atoms;
wherein said organo phosphite is provided by one or more of the following:
(a) by mixing said organo phosphite with said elastomer(s) and said synthetic silica,
(b) by pre-reacting said halogenated copolymer of isobutylene and p-methyl styrene with said organo phosphite prior to blending said reinforcing filler therewith,
(c) by pre-reacting said organo phosphite with an aqueous dispersion of colloidal silica particles from which a precipitated silica is recovered to form an organo phosphitelsilica composite thereof,
(d) mixing said organo phosphite with said elastomer(s) and said synthetic silica, according to any of said steps (a), (b) or (c), wherein said synthetic silica includes at least one of said pre-hydrophobated silica aggregates which has been pre-hydrophobated prior to mixing with said elastomers,
(e) mixing said organo phosphite with said elastomer(s) and an alkylsilane of the said Formula (I) with said elastomer(s) and said synthetic silica, preferably in an internal rubber mixer, and
(f) by pre-reacting said organo phosphite and said alkylsilane of Formula (1) with
 (i) said aggregates of synthetic precipitated silica or
 (ii) an aqueous dispersion of colloidal silica particles from which a precipitated silica is recovered to form a silica composite thereof.

In the practice of this invention, said coupling agent for said aggregates of precipitated silica may preferably be, for example, an alkoxysilyl polysulfide such as for example, a bis(3-trialkoxysilylalkyl) polysulfide wherein alkyl radicals for said alkoxy groups are selected from one or more of methyl and ethyl radicals, preferably an ethyl radical and the alkyl radical for said silylalkyl component is selected from butyl, propyl and amyl radicals, preferably a propyl radical and wherein said polysulfide component contains from 2 to 8, with an average of from 2 to 2.6 or from 3.5 to 4, sulfur atoms in its polysulfidic bridge.

Representative of such other coupling agents are, for example, bis(3-triethoxysilylpropyl) polysulfide having an average of from 2 to 2.6 or from 3.5 to 4, sulfur atoms in its polysulfidic bridge.

Such coupling agent may, for example, be added directly to the elastomer mixture or may be added as a composite of precipitated silica and such coupling agent formed by treating a precipitated silica therewith or by treating a colloidal silica therewith and precipitating the resulting composite.

In practice, a portion of said non-black colored underlying rubber layer extends to at least one wall of at least one of said tread grooves and preferably includes at least 10 percent, preferably about 20 to about 95 percent, and preferably including the bottom of said groove of said visually exposed groove surface and less than 5 percent of the outer surface of a black-colored tread lug intended to be ground-contacting which is associated with groove, preferably exclusive of said outer surface of said black-colored lug.

In one aspect of the invention, said coupling agent contains a moiety (e.g. at least one alkoxysilyl group) reactive with hydroxyl groups (e.g. silanol groups) contained on the surface of said silica and another moiety (e.g. polysulfide group) interactive with said diene based elastomer(s).

In a further aspect of the invention, said coupling agent may be exclusive of silane based coupling agents and contain a moiety which does not provide an alcohol byproduct upon reaction with said hydroxyl groups (e.g. silanol groups) contained on the surface of said silica.

In another aspect of the invention, said silica is a precipitated silica in a manner that said silica and coupling agent react in situ within the elastomer host.

In a further aspect of the invention, at least a portion of said silica is provided as a pre-hydrophobated precipitated silica in which said silica and coupling agent react in situ within the elastomer host.

In additional accordance with this invention, said tread includes said non-black colored intermediate tread layer and said black colored, carbon black reinforced tread base layer, wherein said tread base layer is not exposed at the surface of the groove and wherein said visually exposed non-black colored tread intermediate layer includes and extends from the bottom of said groove up to at least seventy percent of the distance from the bottom of said groove to the top of said groove. In one aspect of the invention, said visually exposed intermediate layer extends to the top of said groove adjacent to the outer surface of the associated tread lug designed to be road contacting.

Representative of such brominated poly(isobutylene-co-para-methylstyrene) copolymers is Exxpro 3745 from the ExxonMobil Chemical Company. In practice, a purpose of said coupling agent is to aid in enabling said amorphous silica to reinforce the rubber composition, although in a case where said pre-hydrophobated silica inherently contains a coupling agent, use of an additional coupling agent is not believed to be necessary. For example, such coupling agent may be a coupling agent having a moiety reactive with hydroxyl groups contained on the surface of the amorphous silica (e.g. silanol groups) and another moiety interactive with at least one of said diene-based elastomers. Alternatively, said coupling agent may be contained on the silica itself wherein the silica has been pretreated with a coupling agent prior to its addition to the rubber composition.

In practice, the pre-hydrophobated precipitated silica aggregates might be recovered, for example, from said treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the *Encyclopedia of Chemical Technology*, Fourth Edition (1997), Volume 21, Kirk-Othmer in Pages 1020 through 1026 and U.S. Pat. No. 5,094,829 as well as U.S. Pat. Nos. 5,708,069, 5,789,514 and 5,750,610 for a more detailed discussion.

Representative alkylsilanes of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Representative examples of organomercaptosilanes of Formula (II), namely organomercaptosilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

Representative examples of organo phosphites understood to be commercially available are, for example, triisodecyl phosphite, trilauryl phosphite, tris(tridecyl) phosphite, diphenyl isooctyl phosphite, diphenyl isodecyl phosphite, phenyl diisodecyl phosphite, triphenyl phosphite, triisononylphenyl phosphite, trimethyl phosphite, triethyl phosphite, tris (2-chloroethyl) phosphite, triisopropyl phosphite, tributyl phosphite, triisooctyl phosphite and tris (2-ethylhexyl) phosphite, as well as tris (2,4-di-t-butylphenyl) phosphite, and bis 2,4,6,tri-t-butylphenyl 2-butyl-2-ethyl-1,3-propanediol phosphite; and diphosphites as, for example, distearyl pentaerythritol diphosphite, bis (2,4-di-t-butylphenyl) pentaerythritol diphosphite, bis (2,6, di,t-butyl-4-methylphenyl) pentaerythritol diphosphite, bis (2,4-dicumylphenyl) pentaerythritol diphosphite and mixtures thereof.

Such organo phosphite may be, for example, tris (2-ethylhexyl) phosphite or triphenyl phosphite.

It is preferred that an in situ reaction of said organo phosphite and silica, optionally including the alkylsilane of formula (I), within the elastomer host may be accomplished without an evolution of an alcohol as compared to using the aforesaid alkoxysilyl polysulfide coupling agent by the inherent chemistry of the organo phosphite material and hydroxyl groups contained on the surface of said silica material in which water evolved instead of an alcohol as a byproduct of the reaction.

In the further practice of the invention, the aforesaid in situ reaction of said organo phosphite silica material within the elastomer host via said internal rubber mixing process is accomplished wherein said silica material is a precipitated silica and/or silica-containing carbon black which is hydrophobated prior to its addition to the elastomer (pre-hydrophobated). Such in situ reaction is considered herein to be important as to both the process of mixing and reacting of the organo phosphite and pre-hydrophobated silica material as to a resulting product thereof. In particular, is it considered herein that pre-hydrophobation of the silica material, particularly with an alkyl silane of the general formula (I) enables a more efficient mixing, or processing, of it within the elastomer host in that such pre-hydrophobation of the silica material (A) renders it more compatible with the diene-based elastomer and (B) substantially reduces a tendency for a precipitated silica to agglomerate with itself within the elastomer host.

In the practice of this invention, said pre-hydrophobated precipitated silica aggregates may be pre-hydrophobated, for example, by treating silica in an aqueous colloidal form thereof with said alkylsilane of Formula (I).

In another aspect of the invention, said elastomer composition for said non-black colored tread rubber layer(s) and for rubber composition(s) in direct contact with said non-black colored tread rubber layer(s) of is preferably devoid of rubber processing oil other than paraffinic rubber processing oils which contains less than 8 weight percent aromatic compounds and is preferably devoid of antidegradants other than phenolic antidegradants.

In practice, said non-black colored rubber composition may be prepared, for example, by mixing in at least one sequential preparatory (non-productive) blending step in at least one internal rubber mixer to a temperature in a range of about 100° C. to about 180° C. a blend of said elastomer(s) with said synthetic amorphous silica and/or pre-hydrophobated silica, normally in the absence of sulfur curative, followed by blending the mixture thereof with sulfur curative(s) in a subsequent (productive) blending step in an internal rubber mixer to a temperature in a range of about 95° C. to about 115° C.

In practice, in the case of using the synthetic amorphous silica, a coupling agent may be added in one or more non-productive (preparatory) mixing steps or divided into an addition in a non-productive (preparatory) mixing step and in a productive mixing step together with the sulfur curative.

The reaction of such coupling agent with the hydroxyl groups on the surface of the silica yields an alcohol such as, for example, ethanol during the manufacture of various silica reinforced rubber products. If such evolution of materials other than alcohol in the manufacture of rubber products would be desired, coupling agents which release water instead of alcohol might be used.

BRIEF DESCRIPTION OF THE DRAWINGS

For a further understanding of the invention, drawings are presented to depict a tire with tread of a cap/base construction which is composed of lugs and grooves in which an exposed surface of at least one groove is of a color in contrast to black.

In particular, FIG. 1 is a perspective view of a tire 1 having a tread 2 of a lug and groove configuration in which a visible surface of the tread grooves 3 are of color other than the color of the surface 4 of the tread lugs (face of the tread lugs) designed to be ground contacting.

FIG. 2 is of a cross-sectional view of an co-extruded, unvulcanized tread strip 5 composed of a carbon black reinforced, black colored tread cap 6 and underlying tread base 7 with outlying tread miniwings 8. The tread cap 6 is of a rubber composition intended to have suitable treadwear and traction characteristics. The tread base 7 rubber composition is intended to support the tread cap 6, and is normally not intended be ground contacting and therefore is of a different rubber composition which does not have as suitable treadwear characteristics as the tread cap 6 rubber composition. In particular, the tread base 7 rubber composition, for this invention, is of a non-carbon black containing, non-black color and contains reinforcement of particulate synthetic amorphous aggregates of silica together with a silica coupling agent. The tread miniwings 8 are of a carbon black reinforced, black colored, rubber composition which differs from the rubber composition of the tread cap 6 and the tread base 7 rubber composition.

FIG. 3 is of a cross-sectional view of an co-extruded, unvulcanized tread strip 9 similar to the tread strip 5 of FIG. 2 of a cap 6 and base 7 construction wherein the tread cap 6 is of a carbon black containing, black color, similar to the tread cap 6 of FIG. 3. The tread strip 9, however, contains an intermediate layer 10 positioned between the tread cap layer 6 and tread base layer 7. For the tread strip 9, said tread base 6 is of a carbon black containing, black colored, rubber composition which different from the rubber composition of the tread base 6 of the tread strip 5 of FIG. 2 and does not have as good a wear characteristic. The intermediate tread layer 10 for this invention, is of a non-carbon black containing, non-black color and contains reinforcement of particulate synthetic amorphous aggregates of silica together with a silica coupling agent. The tread miniwing layer 8 rubber composition is of a carbon black, black colored rubber composition which may be the same or different from the tread base layer 7 rubber composition.

FIG. 4 is a partial cross-sectional view of a tire showing of a molded and vulcanized tread 11, derived from the tread strip 5 of FIG. 2 with its cap 6 and base 7 construction and now having a molded lug 12 and groove 13 configuration. In particular, the non-black colored base layer 7, namely, a layer which underlies the tread cap layer 7, extends to and includes a visible surface 14 of the bottom of the tread groove 15 and is exclusive of the outer surface 16 (lug face) of the associated black-colored tread lugs 12 which is designed to be ground contacting.

FIG. 5 is the same as FIG. 4 except that the non-black colored visible surface 14 of the tread groove 15 extends to but does not extend over the outer surface 16 (lug face) of the associated black-colored tread lug 12 which is designed to be ground contacting.

FIG. 6 is a partial cross-sectional view of a tire showing of a molded and vulcanized tread 16, derived from the tread strip 7 of FIG. 3 with its cap 6, base 7 and intermediate layer 10 construction and now having a molded lug and groove configuration. In particular, the non-black colored intermediate layer 10 extends to and includes a visible surface 14 tread groove 15, including its bottom portion and is exclusive of the outer surface 16 (lug face) of the associated black-colored tread lugs 12 which is designed to be ground contacting.

Figure 1:
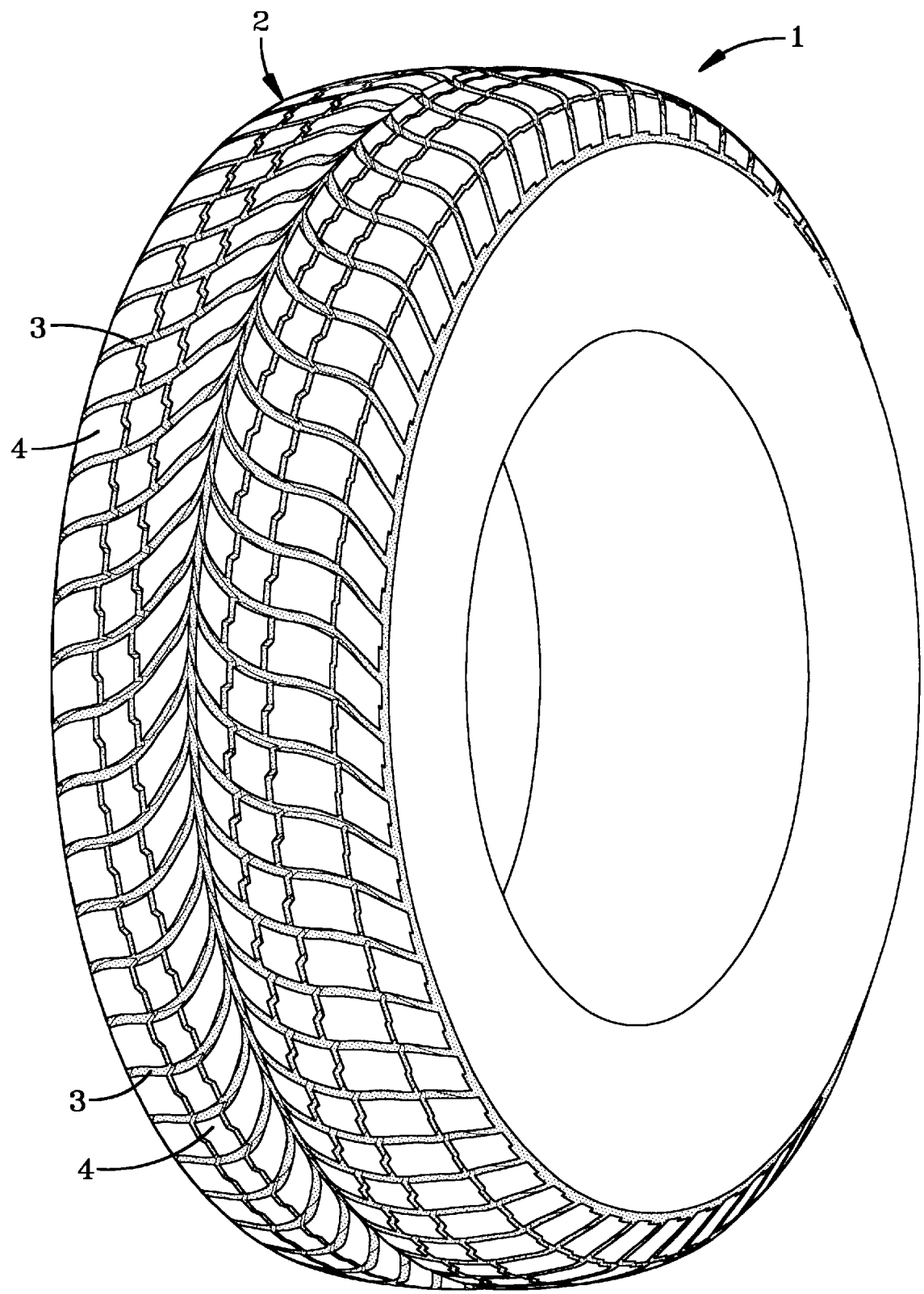
FIG. 1 is a perspective view of a tire having a tread of a lug and groove configuration.
Figure 2:
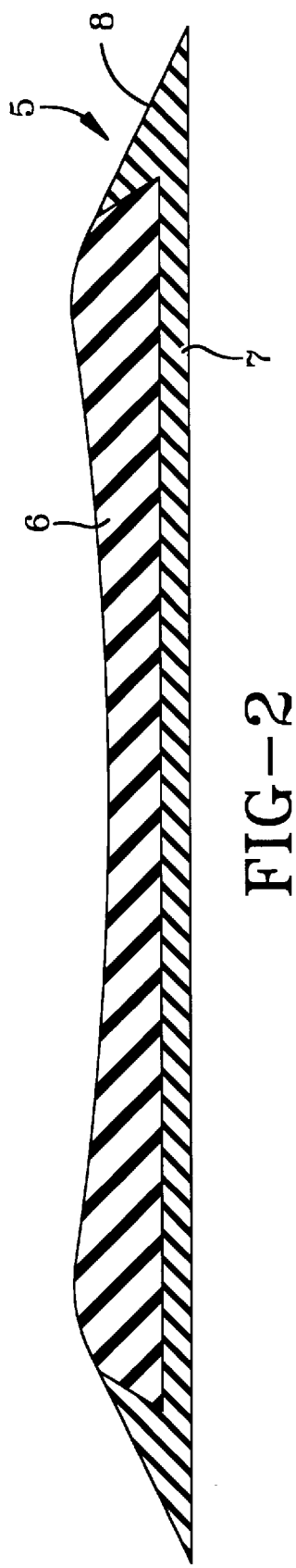
FIG. 2 is a cross-sectional view of a tread strip composed of a tread cap and tread bate with miniwings.
Figure 3:
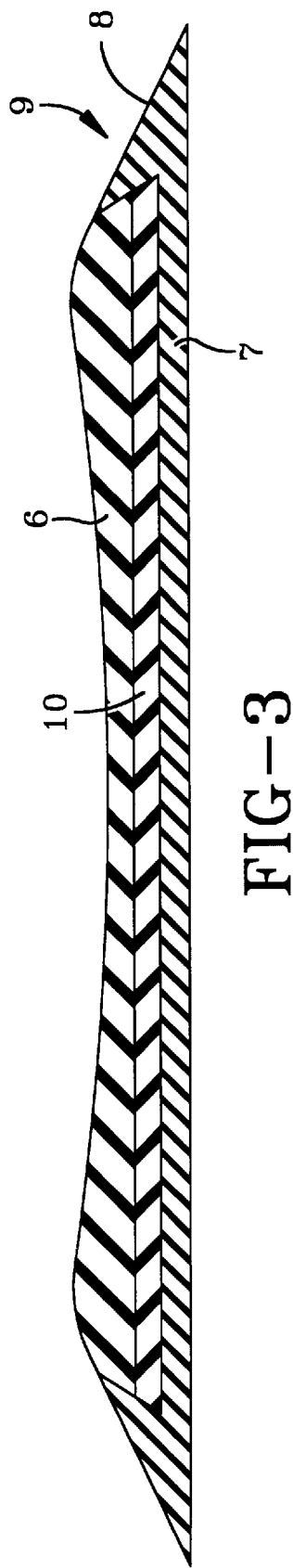
FIG. 3 is a cross-sectional view of a tread strip composed of a tread cap, intermediate layer and tread base with miniwings.
Figure 4:
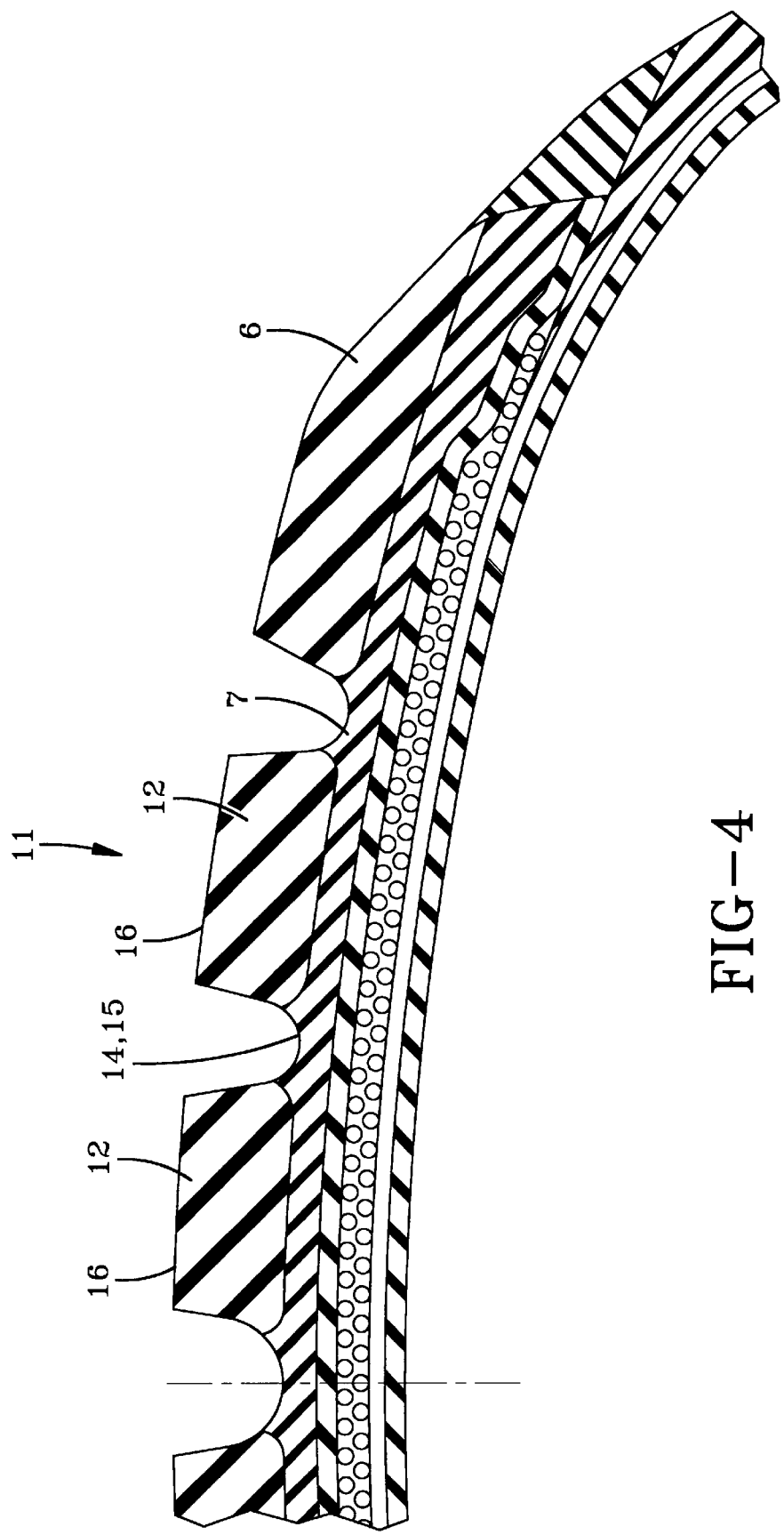
FIG. 4 is a partial cross-sectional view of a tire showing a molded and vulcanized tread derived from the tread strip of FIG. 2 wherein the base layer extends to and includes a visible surface of the tread groove.
Figure 5:
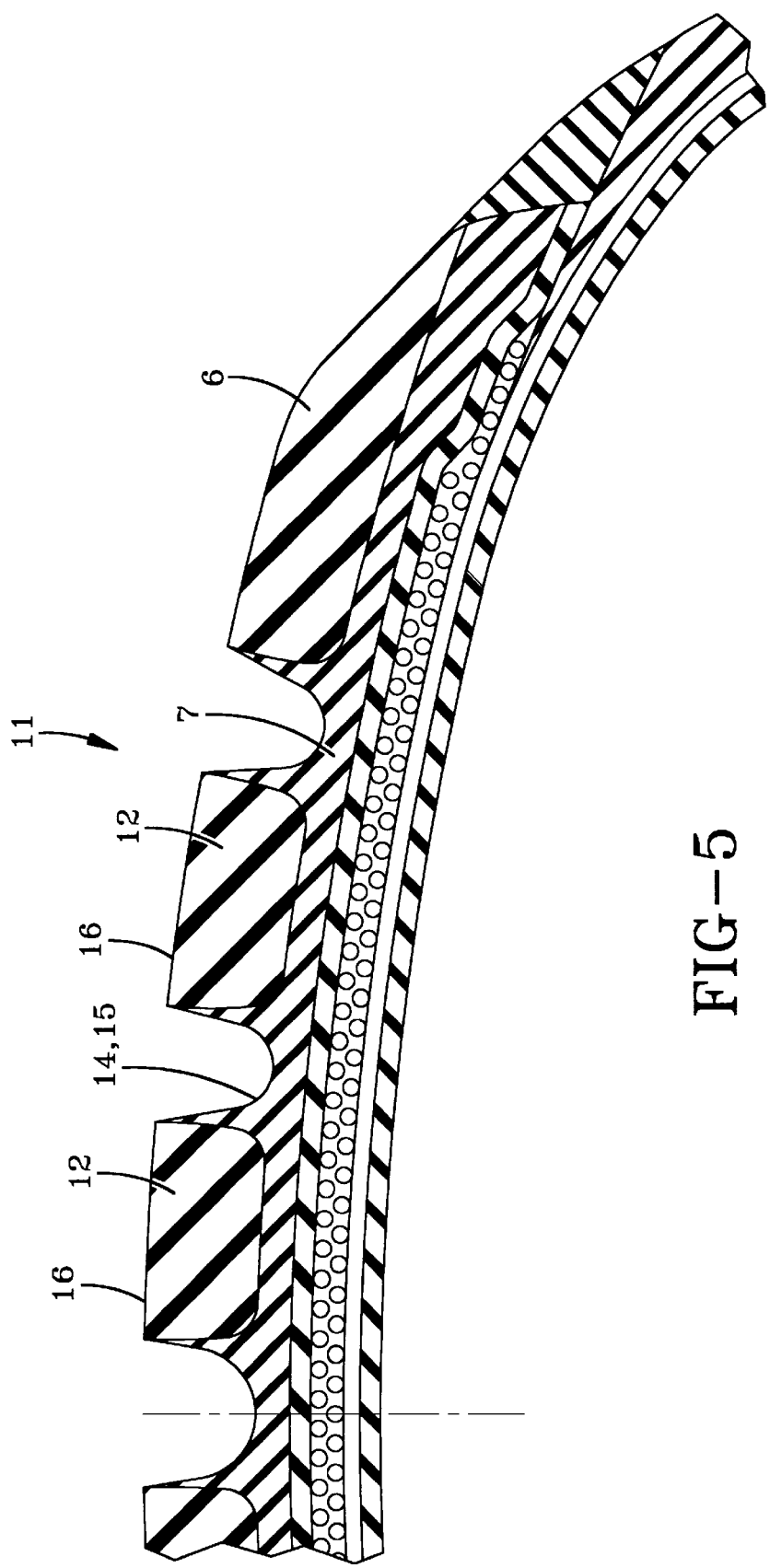
FIG. 5 is a partial cross-sectional view of a tire showing a molded and vulcanized tread derived from the tread strip of FIG. 2 wherein the base layer extends to but not over the outer surface of the lug.
Figure 6:
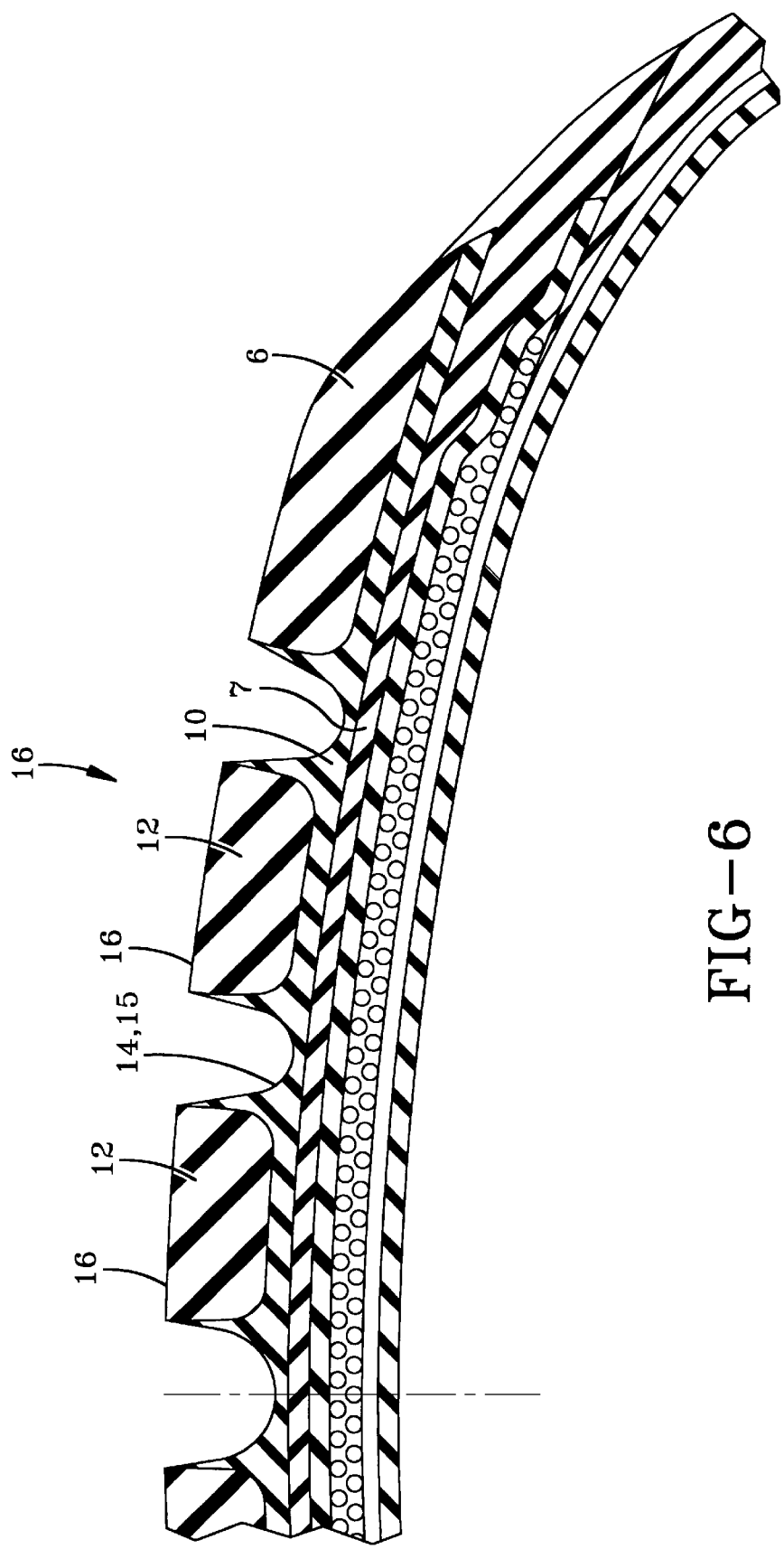
FIG. 6 is a partial cross-sectional view of a tire showing a molded and vulcanized tread derived from the tread strip of FIG. 3 wherein the intermediate layer extends to but not over the outer surface of the lug.

It is to be appreciated that the prepared rubber compositions may be appropriately extruded through a suitable extruder die to form a shaped rubber stock, such as for example a tread stock strip such as depicted, for in FIG. 2 or FIG. 3, the rubber stock (e.g. tread strip) built onto a tire carcass and the resulting assembly vulcanized in a suitable tire mold at a temperature in a range of about 130° C. to about 170° C. to from a tire.

During the molding of the tire assembly in a mold of an internal shape to cause a tread of lug and groove configuration to be prepared.

A significant aspect of the rubber composition for the non-black tread rubber layer is to provide color to enhance tire appearance without sacrificing tire performance parameters. This is considered herein to be important in order to provide a durable produce with good performance.

A significant aspect of the method of preparation of the rubber composition for the non-black tread rubber layer composition is a heat treatment of the silica/silane/polymer reaction may be used, but is not necessary if a pre-reacted silica/coupler composite is used. This is considered herein to be important because reaction is necessary for tire performance for a tread of such rubber composition.

Therefore, in one aspect of the invention the rubber composition for said non-black tread rubber layer composition is prepared in a sequential series of at least two separate and individual preparatory internal rubber mixing steps, or stages, in which the diene-based elastomer is first mixed with the prescribed silica in the absence of carbon black, in a subsequent, separate mixing step and followed by a final mixing step where curatives are blended at a lower temperature and for a substantially shorter period of time.

It is conventionally required after each mixing step that the rubber mixture is actually removed from the rubber mixer and cooled to a temperature in a range of about 50° C. to about 20° C. and then added back to an internal rubber mixer for the next sequential mixing step, or stage.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 180° C.) and elevated pressure in a suitable mold. Such practice is well known to those having skill in such art.

The diene-based elastomers for the tire tread rubber composition of this invention, are, for example, homopolymers and copolymers of at least one conjugated diene such as, for example, isoprene and/or 1,3-butadiene and copolymers of at least one conjugated diene, such as for example, isoprene and/or 1,3-butadiene, and a vinyl aromatic compound such as styrene or alphamethyl styrene, preferably styrene.

Representative of such diene-based elastomers are, for example, elastomers comprised of cis 1,4-polyisoprene (natural and synthetic), cis 1,4-polybutadiene, high vinyl polybutadiene having a vinyl 1,2-content in a range of about 35 to about 90 percent, isoprene/butadiene copolymer elastomers, styrene/butadiene copolymer elastomers (organic solvent solution polymerization formed or prepared and aqueous emulsion polymerization formed or prepared), styrene/isoprene/butadiene terpolymer elastomers, and styrene/butadiene copolymer rubber.

Amorphous silicas are usually aggregates of precipitated silicas although they may be fumed silicas. Precipitated silicas are, for example, those obtained by the acidification of a soluble silicate, e.g., sodium silicate, including blends of a sodium silicate and aluminate. Such precipitated silicas are well known to those having skill in such art.

Such amorphous, particularly aggregates of precipitated, silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 100 to about 400, and more usually about 150 to about 300 cm$^3$/100 g (ASTM D2414).

The silica is conventionally used in conjunction with a coupling agent as hereinbefore discussed to aid in coupling the silica to at least one of said diene based elastomers which may include a halogenated elastomer, and, thus, enhance the elastomer reinforcing effect of the silica. The coupler may be mixed in the same mixing stage with the silica or in a subsequent preparatory mixing stage except that it is preferred that the silica is added to the rubber composition prior to the coupling agent. In practice, then the coupling agent then combines in-situ with the silica within the elastomer host.

Various colorants might be used for the non-black colored rubber composition used in this invention, if desired. For example, such colorants might be pigments, classified according to CAS numbers, for example, red 38 CAS 6358-87-8; violet 32 CAS 12225-0800; blue 15 CAS 147-14-8, copper phthalocyanine; blue 29, CAS 57455-37-5, ultramarine blue; violet 19 CAS 1047-16-1; yellow 110 CAS 106276-80-6, yellow 109 CAS 106276-79-3; and white 6 CAS 13463-67-7, titanium dioxide.

It is readily understood by those having skill in the art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black (for the black colored rubber composition). As known to those skilled in the art, depending on the intended use of the sulfur vulcanizable and sulfur vulcanized material (rubbers), the additives mentioned above are selected and commonly used in conventional amounts.

Representative of phenolic antidegradants for use in this invention are, for example, antioxidants such as polymeric hindered phenol, Wingstay® HLS available from The Goodyear Tire & Rubber Company, including phenolic antidegradants disclosed in *The Vanderbilt Rubber Handbook* (1978), Pages 344 through 346. Other non-staining antidegradants such as poly(oxyalkylene) amine known as OZONOX RP-2 available from Sovereign Chemical Company and cyclic acetal known as Vulkazone AFS available from Bayer A. G., can be considered part of this invention.

Representative non-aromatic rubber processing oils for use in this invention, namely such oils which contain less than 15 weight percent aromatic compounds, if at all, are, and for example, contain 46 percent to 51 percent content and 36 percent to 42 percent naphthenic content.

Typical amounts of fatty acids, if used which can include stearic acid, comprise about 0.5 to about 5 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.0, phr. In another embodiment, combinations of a primary and a secondary accelerator might be used with the secondary accelerator usually being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least two stages, namely, at least one non-productive (preparatory) stage followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

The invention may be better understood by reference to the following examples in which the parts and percentages are by weight unless otherwise indicated.

EXAMPLE I

In this Example, a rubber composition which contained carbon black reinforcement, thereby of a black color, and a rubber composition which contained silica reinforcement, exclusive of carbon black and containing a purple colorant and thereby of a purple color were prepared by mixing the ingredients in an internal rubber mixer in a sequential series of non-productive (without sulfur and accelerators) mixing steps and a final productive (with sulfur and accelerator addition at a lower mix temperature) mixing step.

For the carbon black-containing rubber composition, a total of two non productive mixing steps were used and for the silica reinforced rubber composition, a total of three non-productive mixing steps were used. The rubber compositions were dumped from the rubber mixer after each mixing step, sheeted out from an open mill and allowed to cool to below 40° C. after each mixing step.

The representative rubber compositions shown in the following Table 1 where Sample A (with carbon black reinforcement) is used as a comparative Control Sample and Sample B utilizes the silica reinforcement together with a paraffinic rubber processing oil, non-staining phenolic antioxidant and a silica coupling agent.

The non-productive mixing steps were for about 5 minutes to a temperature of about 160° C. The productive mixing step was for about 2 minutes to a temperature of about 115° C.

Table 1 illustrates the ingredients used for preparing the rubber compositions of Samples A and B.

TABLE 1

|  | Control Sample A | Sample B |
| --- | --- | --- |
| First Non-Productive Mixing Step (to 160° C.) |  |  |
| Styrene/butadiene rubber[1] | 0 | 80 |
| Polybutadiene rubber[2] | 0 | 20 |
| Styrene/butadiene rubber[3] | 96.25 | 0 |
| Budene 1254[4] | 37.5 | 0 |
| Carbon black[5] | 70 | 0 |
| Silica[6] | 0 | 50 |
| Coupling Agent[7] | 0 | 3.9 |
| Aromatic processing oil | 10 | 0 |
| Paraffinic processing oil | 0 | 20 |
| Antioxidant[8] | 0 | 2 |
| Zinc oxide | 2 | 2 |

TABLE 1-continued

|  | Control Sample A | Sample B |
| --- | --- | --- |
| Fatty acid[9] | 2 | 3 |
| Second Non-Productive Mixing Step (to 160° C.) | No | Yes |
| Silica[6] | 0 | 20 |
| Coupling agent[7] | 0 | 1.6 |
| Paraffinic processing oil | 0 | 8 |
| Productive Mixing Step (to 115° C.) |  |  |
| Accelerator(s)[10] | 1.3 | 3.5 |
| Sulfur | 1.5 | 1.4 |
| Antidegradant(s)[11] | 1.2 | 0 |
| Colorant (purple)[12] | 0 | 2 |

[1]Emulsion polymerization prepared styrene/butadiene rubber obtained as Plioflex 1502 from The Goodyear Tire & Rubber Company
[2]Cis 1,4-polybutadiene rubber obtained as Budene 1207 from The Goodyear Tire & Rubber Company
[3]Oil extended emulsion polymerization prepared styrene/butadiene rubber obtained as Plioflex 1712 from The Goodyear Tire & Rubber Company
[4]Oil extended cis 1,4-polybutadiene rubber obtained as Budene 1254 from The Goodyear Tire & Rubber Company
[5]N234 carbon black, an ASTM designation
[6]Obtained as Zeopol ® 8745 from the J. M. Huber Corporation
[7]Obtained as liquid Si69 from Degussa AG, as a bis-(3-triethoxysilylpropyl) tetrasulfide
[8]Non-staining antioxidant Wingstay ® HLS from The Goodyear Tire & Rubber Company
[9]Primarily stearic acid
[10]Sulfenamide and diphenylguanidine or tetramethylthiuram disulfide type
[11]Mixed diaryl-p-phenylenediamine type antioxidant from The Goodyear Tire & Rubber Company
[12]Colorant obtained from Akrochem Corporation An aromatic rubber processing oil was used which can be characterized as 40 percent to 41 percent aromatic, 21 percent to 26 percent naphthenic and 34 percent to 38 percent paraffinic. A paraffinic rubber processing oil was used which can be characterized as 46 percent to 51 percent paraffinic, 36 percent to 42 percent naphthenic and 11 percent to 14 percent aromatic.

The rubber compositions of Table 1 were cured for about 14 minutes at about 160° C. Various resulting physical properties are shown in the following Table 2.

TABLE 2

|  | Sample A | Sample B |
| --- | --- | --- |
| Rheometer, 160° C. |  |  |
| Maximum torque, (dNm) | 12 | 14 |
| Minimum torque, (dNm) | 2.5 | 1.4 |
| Delta torque, dNm (Max-mm torque) | 9.5 | 12.6 |
| T90, minutes | 6.2 | 8.6 |
| Stress Strain (Modulus) |  |  |
| 100% modulus (MPa) | 1.2 | 1.4 |
| 300% modulus (MPa) | 4.7 | 6.1 |
| Tensile strength (MPa) | 17.4 | 18.6 |
| Elongation at break, (%) | 689 | 628 |
| Rebound |  |  |
| 100° C. | 47 | 59 |
| Hardness |  |  |
| Shore A, 100° C. | 48 | 51 |
| DIN Abrasion (10 N force) (cm³ loss) | 73 | 91 |

It is seen from Table 2 that Sample B, a purple colored sample, has superior 300 percent modulus, hardness and rebound as compared to Control Sample A. This is considered herein to be important such properties of a non-black colored rubber lamina which underlies the black colored, carbon black containing, tread lug face are considered herein to be beneficial in promoting good handling and fuel economy for a tire with a tread in addition to adding a non-black colorant which contains a laminate of such composition which underlies the tread lug's face designed to be ground-contacting.

EXAMPLE II

A co-extruded, contoured rubber strip is prepared to be used to form a tire tread on a suitable tire carcass in a suitable mold with an outer lamina of the carbon black reinforced, black-colored rubber composition of Sample A of Example I and an underlying lamina of the purple colored Sample B of Example I.

A rubber tire is prepared as a vulcanized assembly of a tire carcass having a tread of such rubber strip in which the outer, black colored rubber lamina is configured with lugs and grooves in which said purple colored underlying lamina extends to a visible surface of a tread groove, and particularly including the bottom of the tread groove.

EXAMPLE III

In this Example, Control Sample A of Example I is reported as it was in Example I which contained carbon black reinforcement without silica reinforcement and, also therefore without a silica coupling agent.

Samples C and D are reported herein as rubber samples which contain a brominated copolymer of isobutylene and para-methyl stryene rubber (also referred to as "BIMS" rubber as well as at least one diene-based elastomer and silica reinforcement.

Sample D also contained an organo phosphite, namely triphenyl phosphite, as a coupling agent for said BIMS.

For the Sample A carbon black-containing rubber composition, a total of two non productive mixing steps were used (Example I) and for the silica reinforced rubber compositions (Samples C and D) a total of three non-productive mixing steps were used. The rubber compositions were dumped from the rubber mixer after each mixing step, sheeted out from an open mill and allowed to cool to below 40° C. after each mixing step.

The representative rubber compositions shown in the following Table 1 where Sample A (with carbon black reinforcement) is used as a comparative Control Sample and Samples C and D utilized the silica reinforcement together with a paraffinic rubber processing oil, non-staining phenolic antioxidant.

The non-productive mixing steps were for about 5 minutes to a temperature of about 160° C. The productive mixing step was for about 2 minutes to a temperature of about 115° C.

Table 1 illustrates the ingredients used for preparing the rubber compositions of Samples A (from Example I), C and D.

TABLE 3

|  | Control Sample A | Sample C | Sample D |
|---|---|---|---|
| First Non-Productive Mixing Step (to 160° C.) | | | |
| BIMS rubber[1] | 0 | 40 | 40 |
| Polybutadiene rubber[2] | 0 | 30 | 30 |

TABLE 3-continued

|  | Control Sample A | Sample C | Sample D |
|---|---|---|---|
| Polyisoprene rubber | 0 | 30 | 30 |
| Styrene/butadiene rubber[3] | 96.25 | 0 | 0 |
| Budene 1254[4] | 37.5 | 0 | 0 |
| Carbon black[5] | 70 | 0 | 0 |
| Silica[6] | 0 | 66 | 66 |
| Aromatic processing oil | 10 | 0 | 0 |
| Paraffinic processing oil | 0 | 25 | 25 |
| Zinc oxide | 2 | 0 | 0 |
| Fatty acid[7] | 2 | 0 | 0 |
| Phosphite[8] | 0 | 0 | 10 |
| Second Non-Productive Mixing Step (160° C.) | No | Yes | Yes |
| Zinc Oxide | 0 | 2.5 | 2.5 |
| Antidegradants[9] | 0 | 3.0 | 3.0 |
| Carbon black[10] | 0 | 10 | 10 |
| Productive Mixing Step (to 115° C.) | | | |
| Accelerator(s)[11] | 1.3 | 3.5 | 3.5 |
| Sulfur | 1.5 | 2.2 | 2.2 |
| Antidegradant(s)[12] | 1.2 | 0 | 0 |

[1]Brominated copolymer of isobutylene and para-methyl styrene rubber obtained as Exxpro 3745 from The ExxonMobil Chemical Company
[2]Cis 1,4-polybutadiene rubber obtained as Budene 1207 from The Goodyear Tire & Rubber Company
[3]Oil extended emulsion polymerization prepared styrene/butadiene rubber pbtained as Plioflex 1712 from The Goodyear Tire & Rubber Company
[4]Oil extended cis 1,4-polybutadiene rubber obatined as Budene 1254 from The Goodyear Tire & Rubber Company
[5]N234 carbon black, an ASTM designation
[6]Obtained as Zeopol ® 8715 from the J.M. Huber Corporation
[7]Primarily stearic acid
[8]Triphenyl phosphite
[9]P-phenylenediamine type
[10]N472 carbon black, an ASTM designation, obtained as Vulcan XC-72 from Cabot Corporation
[11]Sulfenamide and diphenylguanidine or tetramethylthiuram disulfide type
[10]Mixed diaryl-p-phenylenediamine type antioxidant from The Goodyear Tire & Rubber Company An aromatic rubber processing oil was used which can be characterized as 40 percent to 41 percent aromatic, 21 percent to 26 percent naphthenic and 34 percent to 38 percent paraffinic. A paraffinic rubber processing oil was used which can be characterized as 46 percent to 51 percent paraffinic, 36 percent to 42 percent naphthenic and 11 percent to 14 percent aromatic.

The rubber compositions of Table 3 were cured for about 14 minutes at about 160° C. Various resulting physical properties are shown in the following Table 4, with the physical properties for Sample A simply taken from Table 2 of Example I.

TABLE 4

|  | Sample A | Sample C | Sample D |
|---|---|---|---|
| Stress Strain (Modulus) | | | |
| 100% modulus (MPa) | 1.2 | 1.6 | 1.2 |
| 300% modulus (MPa) | 4.7 | 8.5 | 4.8 |
| Tensile strength (MPa) | 17.4 | 11.5 | 10.9 |
| Elongation at break, (%) | 689 | 417 | 617 |
| Rebound | | | |
| 100° C. | 47 | 67 | 49 |
| Hardness | | | |
| Shore A, 100° C. | 48 | 51 | 51 |
| DIN Abrasion (10 N force) (cm³ loss) | 73 | 172 | 132 |
| Peel Adhesion (95° C.), N | 170 | 38 | 159 |

From Table 4 it is seen that moduli, rebound and hardness values for Sample C, which included the BIMS polymer and silica, are improved over the Sample A values which is indicative of improved tire handling an rolling resistance for tires having treads of such composition.

From Table 4 it is also seen that tear strength as measured in a peel adhesion test and abrasion resistance of Sample D are improved as compared to Sample C which is indicative of improved durability of the rubber composition. Moreover, the properties of Sample D are very similar to Sample A (e.g. modulus, elongation at break, rebound and peel adhesion) indicating good compatibility for Sample A and D rubber compositions when positioned next to each other in an article of manufacture such as, for example a tire.

While various embodiments are disclosed herein for practicing the invention, it will be apparent to those skilled in this art that various changes and modifications may be made therein without departing from the spirit or scope of the invention.

What is claimed is:

1. A tire having a rubber tread configured with lugs and grooves wherein a portion of said grooves are of a non-black color and are exclusive of carbon black and wherein the faces of said lugs are defined by a tread cap layer, designed to ground-contacting, contain carbon black and are thereby of a black color, wherein:
    (A) said rubber tread contains a non-black colored, silica reinforced, rubber layer, exclusive of carbon black, underlying said lug faces, which extends to a visible bottom of at least one of said tread grooves and is thereby exclusive of any appreciable portion of said lug face and wherein said non-black colored rubber layer is an intermediate rubber layer positioned between and co-extruded with said tread cap layer and a black colored, carbon black-containing tread base layer, and wherein
    (B) said non-black colored rubber layer is comprised of
        (1) 100 phr of elastomer comprised of
            (a) about 20 to about 100 phr of at least one diene-based elastomer and
            (b) from zero to about 80 phr of a halogenated copolymer of isobutylene and p-methyl styrene, wherein said halogen is selected from bromine and chlorine,
        (2) about 25 to about 100 phr of silica comprised of aggregates of synthetic amorphous silica, and
        (3) a coupling agent having a moiety reactive with hydroxyl groups on the surface of said silica aggregates and another moiety interactive with at least one of said elastomers;
    wherein said tread base layer is not exposed at the surface of the groove and wherein said visually exposed non-black colored tread intermediate layer includes and extends from the bottom of said groove up to at least seventy percent of the distance from the bottom of said groove to the top of said groove;
    wherein said aggregates of synthetic amorphous silica for said non-black colored rubber layer are comprised of
        (A) aggregates of precipitated silica having hydroxyl groups on the surface thereof, and
        (B) pre-hydrophobated aggregates of precipitated silica having been pre-hydrophobated by treating silica in an aqueous colloidal form thereof with an alkylsilane or with both an organomercaptosilane and an alkylsilane in a weight ratio of said organomercaptosilane to said alkylsilane in a range of from 10/90 to 90/10;
    wherein said alkylsilane is of the general Formula (I)

wherein R is an alkyl radical having from one to 18 carbon atoms, n is a value of from 1 to 3 and X is a radical selected from chlorine, bromine and alkoxy radical as $(OR^1)$—, wherein $R^1$ is an alkyl radical selected from methyl and ethyl radicals, and where said organomercaptosilane is of the general formula (II):

wherein X is a radical selected from chlorine, bromine, and alkyl radicals having from one to 16 carbon atoms; wherein $R^2$ is an alkyl radical having from one to 16 carbon atoms and $R^3$ is an alkylene radical having from one to 16 carbon atoms; and n is a value from zero to 3; and
    wherein said non-black colored rubber layer also contains from zero to 20 phr of at least one organo phosphite, or from 0.5 to 20 phr of at least one organo phosphite where said non-black rubber layer includes said halogenated copolymer of isobutylene and p-methyl styrene, wherein said organo phosphite is selected from monophosphites selected from formula (III) and diphosphites selected from formula (IV) and diisodecyl pentaerythritol diphosphite, distearyl pentaerythritol diphosphite and pentaerythritol diphosphite:

and

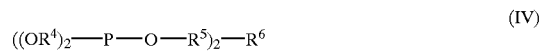

wherein each $R^4$ radical is independently selected from alkyl radicals and phenyl radicals and alkyl substituted phenyl radicals; wherein said $R^4$ alkyl radicals have from 1 to 18 carbon atoms, wherein $R^5$ is a phenyl radical; and wherein $R^6$ is selected from alkyl radicals having from 2 to 8 carbon atoms;
    wherein said organo phosphite is provided by one or more of the following:
        (A) by mixing said organo phosphite with said elastomer(s) and said synthetic silica,
        (B) by pre-reacting said halogenated copolymer of isobutylene and p-methyl styrene with said organo phosphite prior to blending said reinforcing filler therewith,
        (C) by pre-reacting said organo phosphite with an aqueous dispersion of colloidal silica particles from which a precipitated silica is recovered to form an organo phosphite/silica composite thereof,
        (D) mixing said organo phosphite with said elastomer(s) and said synthetic silica, according to any of said steps (A), (B) or (C), wherein said synthetic silica includes at least one of said pre-hydrophobated silica aggregates which has been pre-hydrophobated prior to mixing with said elastomers,
        (E) mixing said organo phosphite with said elastomer(s) and an alkylsilane of the said Formula (I) with said elastomer(s) and said synthetic silica, and
        (F) by pre-reacting said organo phosphite and said alkylsilane of Formula (I) with
            (1) said aggregates of synthetic precipitated silica or
            (2) an aqueous dispersion of colloidal silica particles from which a precipitated silica is recovered to form a silica composite thereof.

2. The tire of claim 1 wherein said non-black colored, underlying rubber layer is comprised of 100 phr of elastomer comprised of (A) about 50 to about 90 phr of at least one diene-based elastomer and (B) about 10 to about 50 phr of a halogenated copolymer of isobutylene and p-methyl styrene, wherein said halogen is bromine.

3. The tire of claim 1 wherein said silica is comprised of aggregates of precipitated silica having hydroxyl groups on the surface thereof.

4. The tire of claim 1 wherein said silica is comprised of pre-hydrophobated aggregates of precipitated silica having been pre-hydrophobated by treating silica in an aqueous colloidal form thereof with both an organomercaptosilane and an alkylsilane in a weight ratio of said organomercaptosilane to said alkylsilane in a range of from 10/90 to 90/10;

wherein said alkylsilane is of the general Formula (I)

$$X_n\text{—Si—}R_{4-n} \quad (I)$$

wherein R is an alkyl radical selected from methyl, ethyl, isopropyl, n-butyl and octadecyl radicals, n is a value of from 1 to 3 and X is selected from a chlorine radical and an alkoxy radical as $(OR^1)$—, wherein $R^1$ is selected from methyl and ethyl and where said organomercaptosilane is of the general formula (II):

$$(X)_n(R^2O)_{3-n}\text{—Si—}R^3\text{—SH} \quad (II)$$

wherein X is selected from a chlorine radical and an alkyl radical selected from at least one of methyl, ethyl, n-propyl and n-butyl radicals; wherein $R^2$ is an alkyl radical selected from methyl and ethyl radicals and $R^3$ is an alkylene radical having from one to 4 carbon atoms, and n is a value from zero to 3.

5. The tire of claim 1 wherein said coupling agent for said aggregates of precipitated silica is a bis(3-trialkoxysilylalkyl) polysulfide wherein alkyl radicals for said alkoxy groups are selected from one or more of methyl and ethyl radicals and the alkyl radical for said silylalkyl component is selected from butyl and propyl radicals, and wherein said polysulfide component contains from 2 to 8, with an average of from 2 to 2.6 or from 3.5 to 4, sulfur atoms in its polysulfidic bridge.

6. The tire of claim 5 wherein said coupling agent is bis(3-triethoxysilylpropyl) polysulfide having an average of from 2 to 2.6 or from 3.5 to 4, sulfur atoms in its polysulfidic bridge.

7. The tire of claim 1 wherein said coupling agent is added directly to the elastomer mixture.

8. The tire of claim 1 wherein said coupling agent is added to the elastomer as a composite of precipitated silica and such coupling agent formed by treating a precipitated silica therewith or by treating a colloidal silica therewith and precipitating the resulting composite.

9. The tire of claim 1 wherein said coupling agent is exclusive of silane based coupling agents and contains a moiety which does not provide an alcohol byproduct upon reaction with said hydroxyl groups contained on the surface of said silica.

10. The tire of claim 1 wherein said pre-hydrophobated precipitated silica aggregates are be recovered from said treated colloidal silica as a treated silica hydrosol, with the aid of acid addition to the treated colloidal silica followed by water washing and drying the recovered hydrophobated silica as hydrophobated precipitated silica.

11. The tire of claim 1 wherein said alkylsilanes of Formula (I) are selected from at least one trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

12. The tire of claim 1 wherein said organomercaptosilanes of formula (II) are selected from at least one of triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

13. The tire of claim 1 wherein said organo phosphites of formula (III) are selected from at least one of triisodecyl phosphite, trilauryl phosphite, tris(tridecyl) phosphite, diphenyl isooctyl phosphite, diphenyl isodecyl phosphite, phenyl diisodecyl phosphite, triphenyl phosphite, triisononylphenyl phosphite, trimethyl phosphite, triethyl phosphite, tris (2-chloroethyl) phosphite, triisopropyl phosphite, tributyl phosphite, triisooctyl phosphite and tris (2-ethylhexyl) phosphite, as well as tris (2,4-di-t-butylphenyl) phosphite, and bis 2,4,6,tri-t-butylphenyl 2-butyl-2-ethyl-1,3-propanediol phosphite; and diphosphites as, for example, distearyl pentaerythritol diphosphite, bis (2,4-di-t-butylphenyl) pentaerythritol diphosphite, bis (2,6, di,t-butyl-4-methylphenyl pentaerythritol diphosphite, bis (2,4-dicumylphenyl) pentaerythritol diphosphite and mixtures thereof.

14. The tire of claim 1 wherein said organo phosphites of formula (IV) are selected from at least one of tris (2-ethylhexyl) phosphite and triphenyl phosphite.

15. The tire of claim 1 wherein said elastomer composition for said non-black colored tread rubber layer(s) are devoid of rubber processing oil other than paraffinic rubber processing oils which contains less than 16 weight percent aromatic compounds and is devoid of antidegradants other than phenolic antidegradants.

16. The tire of claim 1 wherein said elastomer composition for said non-black colored tread rubber layer(s) and for rubber composition(s) in direct contact with said non-black colored tread rubber layer(s) are devoid of rubber processing oil other than paraffinic rubber processing oils which contains less than 16 weight percent aromatic compounds and is devoid of amine based antidegradants.

17. The tire of claim 1 wherein said visually exposed intermediate layer extends to the top of said groove adjacent to the face of the associated tread lug designed to be road contacting.

18. The tire of claim 1 wherein said visually exposed intermediate layer extends to between at least seventy percent and less than five percent of the distance from the bottom of said groove to the top of said groove.

* * * * *